(12) United States Patent
Hernandez

(10) Patent No.: US 6,244,788 B1
(45) Date of Patent: Jun. 12, 2001

(54) APPARATUS FOR SUPPLYING SOLDER BALLS

(76) Inventor: William Hernandez, 851 W. Calle Ranunculo, Tucson, AZ (US) 85704

(*) Notice: Subject to any disclaimer, the term of this patent is extended or adjusted under 35 U.S.C. 154(b) by 0 days.

(21) Appl. No.: 09/324,380

(22) Filed: Jun. 2, 1999

(51) Int. Cl.$^7$ ................................................ B65G 53/50
(52) U.S. Cl. .......................... 406/144; 406/21; 406/50; 406/109; 406/122
(58) Field of Search ........................ 406/21, 22, 23, 406/50, 83, 109, 122, 136, 144

(56) References Cited

U.S. PATENT DOCUMENTS

| | | | |
|---|---|---|---|
| 1,964,167 | * 6/1934 | Needham | 243/13 |
| 2,891,782 | 6/1959 | Blackman et al. | 266/34 |
| 3,039,531 | 6/1962 | Scott | 166/70 |
| 3,218,175 | 11/1965 | Siegel et al. | 99/28 |
| 3,275,191 | 9/1966 | MacDonald | 221/175 |
| 3,415,450 | 12/1968 | Hawk, Sr. | 239/85 |
| 4,205,931 | * 6/1980 | Singer et al. | 406/109 |
| 4,367,685 | * 1/1983 | Frame | 406/144 |
| 4,986,456 | 1/1991 | Johanson | 222/561 |
| 5,065,932 | 11/1991 | Hayden et al. | 228/55 |
| 5,499,487 | 3/1996 | McGill | 53/473 |
| 5,540,377 | 7/1996 | Ito | 228/41 |
| 5,551,216 | 9/1996 | McGill | 53/473 |
| 5,624,054 | 4/1997 | Buns | 221/6 |
| 6,120,216 | * 9/2000 | Teoh et al. | 406/124 |

* cited by examiner

*Primary Examiner*—Christopher P. Ellis
*Assistant Examiner*—Joe Dillon, Jr.
(74) *Attorney, Agent, or Firm*—Stephen T. Sullivan

(57) ABSTRACT

An apparatus is provided for supplying solder balls to a receptacle. The apparatus includes a reservoir for storing the solder balls and a flow path. The flow path includes a first end connected to and in fluid communication with the reservoir and a second end for supplying the solder balls to the receptacle. The apparatus includes a flow actuator in fluid communication with the flow path to actuate the flow of the solder balls from the reservoir through the flow path to the receptacle. A trap is disposed in the flow path for trapping the solder balls and stopping the flow of the solder balls to the receptacle when the flow actuator is not actuated. Related methods are also disclosed.

11 Claims, 2 Drawing Sheets

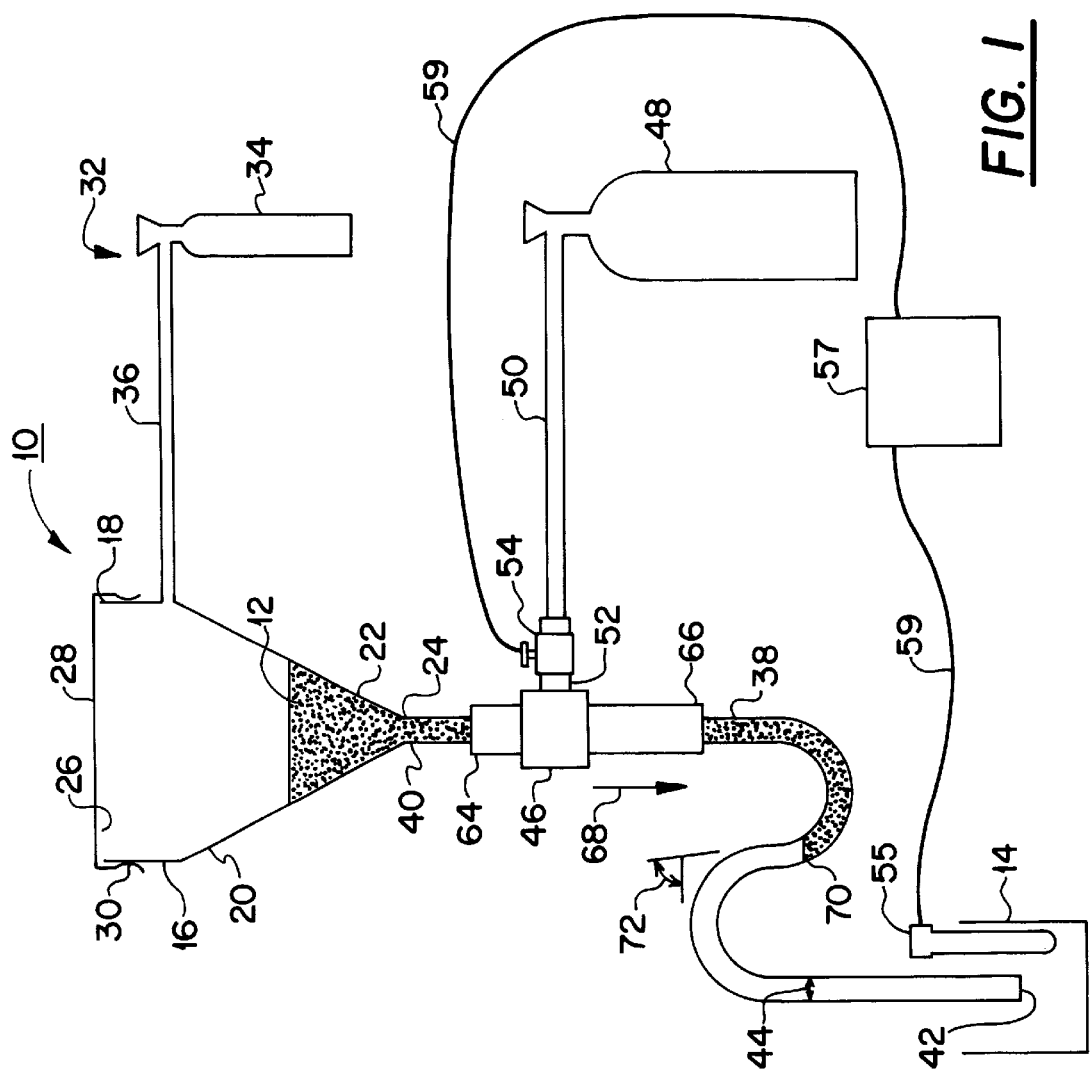
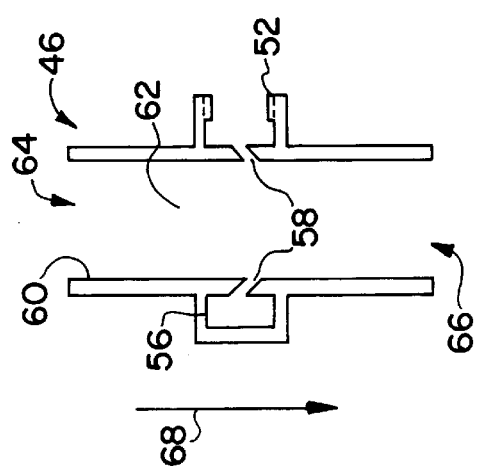
FIG. 1
FIG. 2

APPARATUS FOR SUPPLYING SOLDER BALLS

BACKGROUND OF THE INVENTION

1. Field of the Invention

The present invention relates to apparatus and methods pertaining to ball grid array technology and, more specifically, to apparatus and methods for supplying solder balls.

2. Description of the Related Art

The electronics industry is one of the most dynamic and important industries today. It has literally transformed the world and provides many products that affect our daily lives, for example, telephones, television, personal computers, cellular phones, pagers, video camcorders, audiovisual products, etc. A key area of development in the electronics industry is the area of chip level packaging and interconnections. Solder bumping provides the highest level of packaging density with the least package space. The solder bumping is created by solder balls which are re-flowed onto connection points or pads on the chip and/or the package. The solder balls are arranged in arrays on the chips and the packages. These arrays are known as ball grid arrays ("BGA").

Ball grid array packaging is rapidly emerging as the technology of choice for high input/output (I/O) count integrated circuits (IC's). Ball grid arrays deliver higher density and yields than traditional packages without requiring fine-pitch processing or new assembly equipment. Driven by the increasing I/O as IC's become larger and more complex, the demand for ball grid array packages is expected to grow from fewer than 20 million units in 1995 to more than 2 billion by 1999.

The low cost, high volume nature of the electronics industry requires highly automated production. Solder balls must be placed on chips at extremely high rates automatically. Equipment for performing operations involving solder balls has become very quick and efficient. To be cost efficient, the industry requires a long mean time between assistance (MTBA) of the process by an operator. The main factor which dictates the MTBA for ball grid array equipment is the solder ball capacity of the equipment. Typical BGA equipment have reservoirs which will hold on the order of 250 thousand solder balls. The actual number of solder balls is dependent on the size of the solder ball being processed. Typical BGA equipment requirements are MTBA's of 4 hours, with the industry pushing for increases to 6 and even 8 hours. Additionally, BGA equipment manufacturers continue to improve in throughput rate (the number of BGA's per hour produced by the equipment). As a result, solder ball reservoir capacities must increase to maintain the same MTBA.

The solder balls typically used in BGA technologies generally comprise eutectic solders such as tin-lead solders, solder coated copper, or high temperature alloys. Examples of tin-lead solder ball compositions are 63% tin—37% lead and 62% tin—36% lead—2% silver, typically for use with plastic ball grid arrays, and 10% tin—90% lead, typically for use with ceramic ball grid arrays, although other compositions are possible. The solder balls used in current applications typically have sizes ranging from as small as 5 mills (thousandths of an inch) to as large as 30 mills. Other sizes and size ranges may be used as well. As used herein, the term "solder ball" is used to refer to the generally spherical unit of solder used in ball grid arrays to bond and electrically couple electrical connections such as solder pads or bonding sites on substrates such as chips to an object to which the substrate is to be electrically coupled.

It is generally a necessity for high-quality ball grid array technology that the solder balls be accurately placed on the solder pads. Placement must be done in a way that preserves the physical and geometric integrity of the solder ball. It is generally unacceptable, for example, for any deformation of the solder balls, slicing of the solder balls, etc. to occur. When a solder ball is cut in two during handling or processing, for example, it is generally necessary to stop the process, inspect the solder ball reservoir for ball fragments, and to remove those ball fragments before processing can continue.

There are a large variety of methods and apparatus for distributing the solder balls onto substrates, and otherwise for the handling, control and placement of the solder balls. U.S. Pat. No. 5,499,487, issued to McGill on Mar. 19, 1996 and U.S. Pat. No. 5,551,216, issued to McGill on Sep. 3, 1996, provide examples. In these patents, a device is disclosed which comprises an apparatus for placing solder balls in a ball grid array. BGA equipment, such as is disclosed in these patents, have limited reservoirs for supplying solder balls to the equipment. Due to the design of the BGA equipment, the equipment reservoirs are exposed to the atmosphere. Solder balls are inherently sensitive to corrosion when exposed to the atmosphere. Solder ball exposure time to the atmosphere must be limited to prevent damage to the solder balls. The BGA equipment solder ball reservoirs are small and must be refilled frequently, decreasing the MTBA of the equipment. It is desirable to automatically refill the reservoirs on the equipment so operator assistance is not required. Large reservoirs automatically feeding the equipment reservoir have been used to increase MTBA's. These automated reservoirs, or solder ball supplies, are typically sealed to minimize atmospheric exposure of the solder balls. Prior solder ball supplies have typically used gravity to supply the solder balls to the equipment reservoir and mechanical gates to start and stop the flow of solder balls to the equipment.

One limitation of prior solder ball supplies is that the mechanical gates generally used have a tendency to damage some of the solder balls. These mechanical gates can also have a tendency to cause solder balls to clog and jam the flow of solder balls at the gate. This is due to the discontinuous nature of the flow path at the location of the gate, which is generally required by the use of mechanical gates. Another limitation of prior solder ball supplies is that they generally do not allow for the adjustment of solder ball supply rates. Another limitation of prior solder ball supplies is that they generally have limited solder ball capacities. Another limitation of prior solder ball supplies is that they generally do not provide for quick changeover of solder balls from one type to another.

OBJECTS OF THE INVENTION

Accordingly, an object of the present invention is to provide an apparatus and method for supplying solder balls to a receptacle that allows for long MTBA's.

Another object of the present invention is to provide an apparatus and method for supplying solder balls to a receptacle at high rates.

Another object of the present invention is to provide an apparatus and method for supplying solder balls to a receptacle that minimizes damage to solder balls.

Another object of the present invention is to provide an apparatus and method for supplying solder balls to a receptacle that allows for automatic control of the solder ball supply.

Another object of the invention is to provide an apparatus and method for supplying solder balls to a receptacle that minimizes clogging of solder balls in the flow path.

Another object of the invention is to provide an apparatus and method for supplying solder balls to a receptacle that provides for quick changeover of solder balls from one type to another.

Additional objects and advantages of the invention will be set forth in the description which follows, and in part will be apparent from the description, or may be learned by practice of the invention. The objects and advantages of the invention may be realized and obtained by means of the instrumentalities and combinations pointed out in the appended claims.

SUMMARY OF THE INVENTION

To achieve the foregoing objects, and in accordance with the purposes of the invention as embodied and broadly described in this document, in accordance with one aspect of the invention an apparatus is provided for supplying solder balls to a receptacle. The apparatus includes a reservoir for storing the solder balls and a flow path. The flow path has a first end connected to and in fluid communication with the reservoir and a second end for supplying the solder balls to the receptacle. The apparatus further includes flow actuator in fluid communication with the flow path to actuate the flow of the solder balls from the reservoir through the flow path to the receptacle. A trap is disposed in the flow path for trapping the solder balls and stopping the flow of the solder balls to the receptacle when the flow actuator is not actuated.

In the preferred embodiment of this aspect of the invention, the reservoir is a hopper with a feed in fluid communication with the first end of the flow path. The feed is located at the bottom of the hopper. The reservoir includes an opening for providing access to the reservoir and the opening being sealed by a lid. The reservoir includes a non-reactive gas purge for providing a non-reactive gas to the reservoir. The non-reactive gas is nitrogen, an inert gas, or dry air. The non-reactive gas is most preferably, nitrogen.

In this preferred embodiment the reservoir has a reservoir capacity equal to the maximum volume of solder balls which can be stored in the reservoir. The reservoir capacity is preferably at least about one liter, and more preferably about one liter and about four liters.

In this preferred embodiment the flow path is a tube. The tube has an inside diameter of about 0.1 inches to about 1.0 inches. The flow actuator preferably is a pump located in the flow path between the first end and the second end. The flow actuator preferably is an ejector pump and the apparatus further includes a fluid supply. The fluid supply is in fluid communication with the ejector pump for selectively providing a working fluid to the ejector pump to actuate the flow of the solder balls. The working fluid is preferably a gas at a pressure of about 15 psig to about 120 psig and more preferably about 30 psig to about 60 psig. The working fluid preferably is air or nitrogen. The ejector pump preferably actuates flow of the solder balls in the flow path at a flow rate of at least go about 20,000 solder balls per second and more preferably at least about 50,000 solder balls per second.

In the preferred embodiment of this aspect of the invention the trap is a vertical elevation in the flow path which traps the solder balls at the vertical elevation by gravity. The vertical elevation is preferably located between the flow actuator and the second end of the flow path. The vertical elevation preferably has a height of about one inch to about four inches and more preferably about two inches.

In accordance with another aspect of the invention an apparatus is provided for supplying solder balls to a receptacle. The apparatus includes a reservoir for storing the solder balls and a flow path. The flow path includes a first end connected to and in fluid communication with the reservoir and a second end for supplying the solder balls to the receptacle. The apparatus includes an ejector pump in fluid communication with the flow path, and a fluid supply in fluid communication with the ejector pump. The fluid supply is for selectively providing a working fluid to the ejector pump to actuate the flow of the solder balls from the reservoir through the flow path to the receptacle. A vertical elevation is disposed in the flow path for trapping the solder balls at the vertical elevation by gravity and stopping the flow of the solder balls to the receptacle when the ejector pump is not actuated.

In the preferred embodiment of this aspect of the invention, the reservoir is a hopper with a feed in fluid communication with the first end of the flow path. The feed is located at the bottom of the hopper. The reservoir preferably includes a non-reactive gas purge for providing a non-reactive gas to the reservoir. The non-reactive gas preferably is nitrogen, an inert gas, or dry air. The reservoir has a reservoir capacity equal to the maximum volume of solder balls which can be stored in the reservoir, and the reservoir capacity preferably is at least about one liter.

In this preferred embodiment, the ejector pump is located in the flow path between the first end and the second end. The flow path preferably is a tube. The working fluid preferably is a gas at a pressure of about 15 psig to about 120 psig. The ejector pump preferably actuates flow of the solder balls in the flow path at a flow rate of at least about 20,000 solder balls per second. The vertical elevation preferably is located between the flow actuator and the second end of the flow path and has a height of about one inch to about four inches.

In accordance with another aspect of the invention, a method is provided for supplying solder balls to a receptacle. The method includes a first step of placing the solder balls in a location. The location has a flow path in fluid communication with is. The flow path requires an actuation energy for the solder balls to flow from the location to the receptacle. The actuation energy is greater than a force on the solder balls provided by gravity when the solder balls are in the location so the solder balls do not flow from the location to the receptacle absent the actuation energy.

The method includes a second step of selectively providing the actuation energy to the solder balls to cause the solder balls to flow from the location to the receptacle. The method includes a third step of removing the actuation energy to cause the solder balls to stop flowing from the location to the receptacle.

In the preferred embodiment of this aspect of the invention, the location is the interior of a solder ball reservoir. The location is in the vicinity of an atmosphere and the location preferably includes an environmental barrier that substantially isolates the location from the atmosphere to deter corrosion of the solder balls in the location. The first step preferably includes purging the location with a non-reactive gas. The non-reactive gas preferably is nitrogen, an inert gas, or dry air. The location has a capacity corresponding to the maximum volume of solder balls which will fit in the location, and the capacity preferably is at least about one liter.

In this preferred embodiment, in the first step the flow path is a tube. The flow path preferably has a vertical elevation with a height. The height requires the actuation energy to lift the solder balls over the height for the solder balls to flow from the location to the receptacle. The height preferably is about one inch to about four inches.

In this preferred embodiment, in the second step the actuation energy is provided in the form of a working fluid at a pressure by selectively discharging the working fluid through at least one orifice into the flow path so the solder balls flow from the location to the receptacle. The working fluid preferably is a gas with a pressure of about 15 psig to about 120 psig. The actuation energy preferably causes the solder balls to flow at a flow rate of at least about 20,000 solder balls per second.

BRIEF DESCRIPTION OF THE DRAWINGS

The accompanying drawings, which are incorporated in and constitute a part of the specification, illustrate presently preferred embodiments and methods of the invention and, together with the general description given above and the detailed description of the preferred embodiments and methods given below, serve to explain the principles of the invention.

FIG. 1 is a front cutaway view of the apparatus for supplying solder balls to a receptacle in accordance with the first preferred embodiment of the invention;

FIG. 2 is a cutaway view of a the ejector pump for use in connection with the apparatus shown in FIG. 1.

DETAILED DESCRIPTION OF THE PREFERRED EMBODIMENTS AND METHODS

Figure 3:
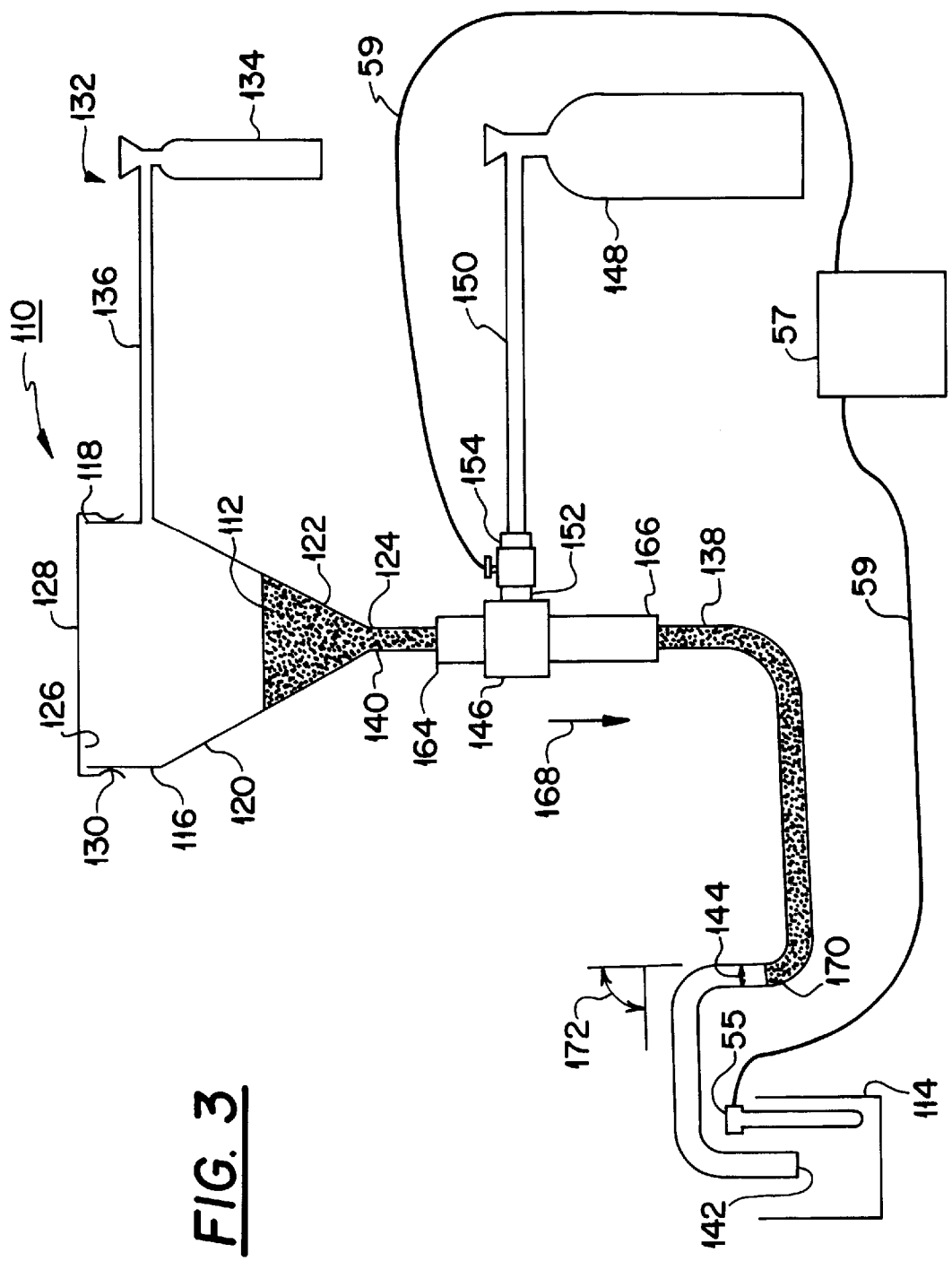
FIG. 3 is a front cutaway view of the apparatus for supplying solder balls to a receptacle in accordance with the second preferred embodiment of the invention.

Reference will now be made in detail to the presently preferred embodiments and methods of the invention as illustrated in the accompanying drawings, in which like reference characters designate like or corresponding parts throughout the drawings. It should be noted, however, that the invention in its broader aspects is not limited to the specific details, representative devices and methods, and illustrative examples shown and described in this section in connection with the preferred embodiment and method. The invention according to its various aspects is particularly pointed out and distinctly claimed in the attached claims read in view of this specification, and appropriate equivalents.

In accordance with one aspect of the invention, an apparatus is provided for supplying solder balls to a receptacle. In the preferred embodiments the apparatus 10 is for supplying solder balls 12 to a receptacle 14 as depicted in FIG. 1. The receptacle may be any item or containing device for receiving solder balls. Examples of common receptacles for solder balls include reservoirs for equipment such as solder balls handling and processing equipment, for example, BGA equipment and the like, storage containers for solder balls such as, for example, jars, bags, cans, totes or bins, and any other repository for receiving solder balls. The preferred embodiments of the apparatus 10 are for use with solder ball handling equipment where the receptacle 14 is the reservoir of the solder ball handling equipment.

In accordance with this aspect of the invention the apparatus includes a reservoir for storing the solder balls. In the preferred embodiment the reservoir 16 is for storing the solder balls. The reservoir has a top 18, side walls 20, and a bottom 22 as shown in FIG. 1. In the preferred embodiment the reservoir 16 is a hopper and the reservoir has a feed 24 located at the bottom of the reservoir. The feed is an outlet for the solder balls to exit the hopper. The bottom tapers in a conical fashion from the side walls to the feed 24 so that the solder balls 12 will flow to the feed as the reservoir 16 is emptied of solder balls. The reservoir 16 includes an opening 26 which is preferably disposed at the top of the reservoir. The opening is sealed by a lid 28 that fits over the opening. The opening 26 is for providing access to the reservoir, primarily for the purpose of loading the reservoir with solder balls. The reservoir is loaded with solder balls 12 prior to supplying the solder balls to the receptacle 14 such as the reservoir of solder ball handling equipment. This may be prior to a shift, or during a shift when the solder ball handling equipment is being used. The reservoir 16 preferably includes a level sensor to detect when the solder ball level in the reservoir is low. This way the operator may be warned when the solder ball level in the reservoir is low so the apparatus 10 will not be allowed to run out of solder balls.

The opening 26 is typically sealed by the lid 28 after the solder balls are loaded into the reservoir 16. This seals the reservoir from exposure to the atmosphere so the solder balls do not corrode, as will be described in more detail later. The lid may include a gasket, an O'ring, or another means of improving the seal of the lid to the reservoir. A loose seal may be desirable to allow some gas to get by the seal when the reservoir is pressurized, for example, buy a gas purge, as will be described in more detail later. The lid 28 also preferably will have a fastener 30 to hold the lid on the reservoir 16 over the opening 26. The fastener 30 may be any additional feature or combination of features, which will fasten the lid to the reservoir when the lid is mounted to the reservoir over the opening 26. Examples of fasteners include a slip fit joint between the lid and the reservoir, one or more clamps on the lid or the reservoir, a threaded joint where the lid and the reservoir thread together at the opening, one or more latches, combinations of latches or clamps with a hinge between the lid and the reservoir, screws or bolts, etc.

The opening 26 may also be used to unload solder balls from the reservoir 16 at the end of a shift, for example, if not all the solder balls in the reservoir were used. This may be desirable if the apparatus 10 will not be used for a significant period of time, or if maintenance is to be performed on the apparatus before its next use. The unloading of solder balls may also be required if the solder ball size needs to be changed. The solder balls may also be unloaded by actuating the apparatus to cause the solder balls to flow from the apparatus, as will be described in more detail later. The opening 26 may also be used as access into the reservoir 16 to clean or maintain the apparatus 10.

In the preferred embodiment the reservoir 16 includes a non-reactive gas purge 32 for providing a non-reactive gas to the reservoir as shown in FIG. 1. The non-reactive gas is to limit or prevent the corrosion of the solder balls while they are in the reservoir. Such corrosion would limit the effectiveness of the solder balls for use in their required application, such as in a ball grid array on a substrate.

The non-reactive gas purge 32 includes a non-reactive gas supply 34 and plumbing 36 for routing the non-reactive gas from the non-reactive gas supply to the reservoir 16. The plumbing 36 includes all the necessary piping and fittings to provide a fluid communication path between the non-reactive gas supply and the reservoir. The non-reactive gas purge 32 preferably has a valve or other such mechanism for turning the supply of the non-reactive gas on and off. The non-reactive gas purge also preferably has a regulator for regulating the pressure and the flow of the non-reactive gas to the reservoir. The non-reactive gas is chosen to inhibit the corrosion of the solder balls 12. Generally, the non-reactive gas is a non-oxidizing gas. Preferable gases for use as the non-reactive purge gas are nitrogen, an inert gas such as argon or helium, or dry air. Dry air will work as a non-reactive gas in some applications even though the air includes oxygen, which by its very nature is an oxidizer, because oxygen will not oxidize many materials at an appreciable rate at room temperature if water is not present to catalyze the oxidation process. Nitrogen is the preferred non-reactive gas for use with the apparatus 10. Nitrogen is readily available in industrial purity, which consists essentially of pure nitrogen, for very little cost.

The reservoir 16 preferably is not gas tight. This allows for the non-reactive gas purge 32 to provide a steady flow of clean, dry non-reactive gases to the reservoir. This allows any atmospheric air which enters the reservoir during loading, unloading, or any other times to be quickly purged from the reservoir and displaced by the non-reactive gas. Leak paths may be designed into the apparatus, but this is generally not necessary, as the solder ball flow path will typically provide adequate gas leakage to allow the non-reactive gas purge to perform properly, as will be described in more detail later.

The reservoir 16 has a reservoir capacity which is equal to the maximum volume of solder balls 12 which can be stored in the reservoir. The reservoir capacity is generally somewhat less than the total volume of the reservoir, because it is typically impractical to fill the reservoir completely. Since the size of the solder balls varies from application to application, it is not possible to precisely state the reservoir capacity as number of solder balls which can be fit in the reservoir, however, the reservoir will typically hold at least about 5 million average size solder balls (0.015" to 0.02" in diameter). The reservoir capacity is generally at least about one liter, and preferably about two to about four liters. Any size of reservoir is possible, but the reservoir capacity is generally selected as the minimum capacity which will provide acceptably long mean time before operator refills or assists, MTBA. A size significantly larger than this will result in a larger size and cost for the apparatus 10. The industry preference is to keep size and cost to the minimum required value. The preferred reservoir capacity will most likely increase in the future as the rate of solder ball consumption in solder ball handling equipment increases.

Further in accordance with this aspect of the invention, the apparatus includes a flow path with a first end connected to and in fluid communication with the reservoir and a second end for supplying the solder balls to the receptacle.

In the preferred embodiment the apparatus 10 includes a flow path 38 with a first end 40 connected to the reservoir 16 at the feed 24 as shown in FIG. 1. The first end 40 is in fluid communication with the feed 24 and the reservoir 16 so solder balls 12 can flow from the reservoir into the flow path. The flow path 38 also includes a second end 42 which is located at the other end of the flow path. The second end 42 is in fluid communication with the first end of the flow path so solder balls can flow from the first end to the second end. The second end is the solder ball exit of the apparatus 10 and is for supplying solder balls 12 to the receptacle 14 such as the reservoir of solder ball handling equipment. In use, the second end of the flow path is attached to, or located adjacent to the receptacle so that solder balls flow into the receptacle when the apparatus is actuated, as will be described in more detail later.

The flow path 38 may be of any configuration and geometry. The flow path may be a duct with an open top, or it may be a conduit with all sides sealed so that the only access to the conduit is through the first end 40 or the second end 42. If the flow path is a conduit, the conduit may have a cross-section that is any geometry, for example, the flow path cross section could be circular, rectangular, triangular, oval, etc. The preferred cross section is circular as in a pipe or a tube. In the preferred embodiment the flow path 38 is a tube for transporting the solder balls from the reservoir 16 to the second end 42 of the tube. Tube as the term is used herein includes any standard conduit with a circular cross section, including tubes or pipes either hard or flexible. The tube may be made of any material such as plastic, metal, ceramic, glass, rubber, etc., but metal or plastic tubes which are rigid are preferred. In the preferred embodiment the tube has a ⅜ inch outside diameter and a ¼ inch inside diameter and the tube is made of stainless steel. The flow path 38 may be constructed of multiple discrete tubes with fittings connecting the different sections of the flow path together. Optionally, the last several feet of the flow path may be constructed from a flexible tube so that the second end may be connected to or positioned adjacent to the receptacle 14 with ease. If the tube is plastic it is preferable that the tube be of an anti-static material so that the solder balls so not stick to the tube. The tube has an inside diameter 44, and in the preferred embodiment the tube inside diameter is about 0.1 to about 1.0 inches, and preferably about 0.25 inches. As described previously for the reservoir capacity, any tube size can be used and it is possible as the rate of consumption of solder balls by solder ball handling equipment increases that the preferred tube size will increase. Additionally, the apparatus 10 can be used for solder ball supplying applications which are higher volume and require larger capacities, for example, in the supply of solder balls 12 to solder ball containers in solder ball manufacturing facilities.

Further in accordance with this aspect of the invention; the apparatus includes a flow actuator in fluid communication with the flow path to actuate flow of the solder balls from the reservoir through the flow path to the receptacle.

In the preferred embodiment, the apparatus 10 includes a flow actuator 46 in fluid communication with the flow path 38 to actuate the flow of solder balls 12 from the reservoir 16 to the receptacle 14 as shown in FIGS. 1 and 2. The flow actuator 46 may be located anywhere from the reservoir 16 to the second end 42 of the flow path 38 provided the flow actuator is in fluid communication with the solder balls and the flow path. The flow actuator is preferably a pump for actuating the flow of solder balls. The preferred location for the flow actuator is in the flow path between the first end and the second end of the flow path. The flow actuator is most preferably located near the first end of the flow path so that the flow actuator is close to the solder balls in the reservoir.

The preferred type of pump for use as a flow actuator 46 is an ejector pump as depicted in FIG. 2. The apparatus 10 preferably includes a fluid supply 48 which selectively provides a working fluid to the ejector pump to selectively actuate the flow of solder balls 12. The fluid supply 48 is attached to the ejector pump by plumbing 50 which connect to the ejector pump at a working fluid inlet 52. The plumbing 50 is generally made up of piping and fittings which route the working fluid to the ejector pump. The plumbing provides a fluid communication path between the fluid supply and the ejector pump. The fluid supply may be any source of working fluid with a potential energy which may be converted to a mechanical energy to cause the solder balls to flow. The fluid supply 48 is preferably a pressurized gas and most preferably compressed air. The fluid supply can be bottled pressurized gas or it can be shop air, which is typically provided from one or more central facility locations which include a compressor and a large gas reservoir for storing the pressurized air. In the latter case the fluid supply 48 is simply the necessary plumbing to connect the apparatus 10 to the existing shop air network at the facility. If shop air is available at the facility, it is the preferred source of working fluid due to the extremely low cost of shop air. The ejector pump is preferably sized to provide the required flow rate of solder balls from the apparatus when used with shop air. Typical shop air systems provide up to about 90 to 120 psig of air pressure. The ejector pump is preferably sized to operate in the pressure range of 15 to 120 psig and more preferably 30 to 60 psig to accommodate the use of shop air. Suitable ejector pumps available in many sizes and model and are made by a variety of companies. The DF series of high flow vacuum pumps, for example model number DF 20-3 available from Vaccon Company Inc. of Midfield, Mass. provide adequate performance.

The fluid supply 48 preferably includes an actuation mechanism 54 which is generally located in the plumbing 50 at or near the ejector pump. The actuation mechanism 54 is any form of flow actuator which will provide for the selective supply of the working fluid to the ejector pump. In the preferred embodiment the actuation mechanism is a solenoid valve requiring an electrical or alternately a pneumatic actuation signal to open or close the valve. A preferable actuation mechanism is a normally closed, electrically actuated solenoid valve. This variety of valve, when used in the preferred embodiments, will not supply working fluid to the ejector pump unless an electrical signal is provided to the valve. This prevents the apparatus 10 from inadvertently actuating in the case of a power failure or other such event. The following provides an illustration of the operation of the apparatus with a normally closed, electrically actuated solenoid valve with solder ball handling equipment, where the equipment reservoir is the receptacle 14 for the solder balls 12. When the level of solder balls in the equipment reservoir becomes low, for example below about 50 to 100 thousand solder balls, an actuation signal is provided to the solenoid valve and the valve opens providing the compressed air to the ejector pump. The ejector pump actuates the flow of solder balls from the apparatus 10 to the equipment reservoir, refilling the equipment reservoir with solder balls, for example, to about 250 thousand solder balls. At this time the electrical actuation signal to the valve is discontinued and the flow of solder balls from the apparatus to the equipment reservoir discontinues.

The equipment reservoir 14 preferably has a receptacle level sensor 55 which senses the level of solder balls in the equipment reservoir 14 and provides a signal to a control system 57 to inform the system that the level of solder balls in the equipment reservoir 14 has fallen below a predetermined low level. The control system 57 preferably includes the necessary logic to recognize this signal and provide an electrical actuation signal to the solenoid valve on the apparatus 10 so the valve is opened and compressed air is supplied the ejector pump and the equipment reservoir 14 is refilled with solder balls 12, as described previously. The control system 57 is connected to the receptacle level sensor 55 and the solenoid valve by signal paths 59. The signal paths allow the control system to communicate with the devices. The signal paths 59 may be control wiring, radio frequency communication, fiber optic connection, data highway, pneumatic connection, or any other signal path that will allow the control system to communicate with the receptacle level sensor 55 and the solenoid valve. The preferred signal path is control wiring. The receptacle level sensor in the equipment reservoir 14 preferably detects when the equipment reservoir is full of solder balls 12 and provides another signal to the control system informing the system that the equipment reservoir 14 is full. Again, the control system 57 preferably includes the required logic to recognize this signal and discontinue the electrical actuation signal to the valve so that the solder balls discontinue flowing from the apparatus 10 to the equipment reservoir 14. Alternately, the control system may be programmed to fill the equipment reservoir 14 for a fixed time interval. The time interval is selected to be sufficient to fill the equipment reservoir 14 when a low level of solder balls 12 is detected. When the apparatus 10 is used in this manner, the receptacle level sensor 55 is not required to detect when the equipment reservoir 14 is full.

One of the preferred embodiments of the ejector pump is shown in FIG. 2. The working fluid inlet 52 is threaded to accept a threaded pipe, for example, with a ⅜ inch pipe thread. The ejector pump includes a manifold 56 which distributes the pressurized gas to a set of primary nozzles 58 distributed around the inside wall 60 of the ejector pump. The inside flow passage 62 of the ejector pump is essentially cylindrical in shaped and forms a flow passage through the ejector pump with an inlet end 64 and an exhaust end 66. The inlet end 64 is for receiving material to be pumped by the ejector pump and the exhaust end 66 is for discharging the material from the pump at a flow rate. The inlet and exhaust end of the pump preferably include the necessary features to connect plumbing 50 to the ejector pump, such as threads, flanges, and the like.

The method of operation of the ejector pump is well known. The primary nozzles are for discharging the pressurized gas provided by the working fluid supply at a high velocity, preferably sonic or supersonic. The primary nozzles are oriented to discharge the pressurized gas into the flow passage in the general direction of the flow direction 68, the direction for which the pump is intended to flow, for example, from the inlet end to the exhaust end of the pump. The nozzles may also be oriented somewhat off the flow direction to enhance the mixing and flow of the material being pumped. For example, the DF series of pumps by Vaccon Company, Inc. have the primary nozzles directed partially circumferentially along the flow passage so that the nozzles impart a twisting, or cyclonic component to the flow material. This helps entrain solid bulk materials in the flow stream, enhancing the performance of the pump with these materials. The laws of conservation of mass, energy, and momentum require that the gas flow through the primary nozzles provide a vacuum on the inlet side of the flow passage when compressed gas is flowed through the primary nozzles. The ejector pumps use this vacuum to draw the material being pumped into the ejector pump. In addition, the material mixes with the gases discharging through the primary nozzles and a significant portion of the momentum of these gases are imparted to the material, thus providing a pressure rise across the flow path from the inlet end to the exhaust end. This imparts kinetic energy to the material being pumped so it will flow out of the exhaust end of the pump at a flow rate. The flow rate is dependent upon the properties of the material being pumped, the pressure of the gas provided to the ejector pump, the configuration of the ejector pump, and the pressure up stream and down stream of the pump. The ejector pumps are well suited to this application as they provide no moving parts which might damage the solder balls 12 during operation of the apparatus 10.

The ejector pump and pressure of the working fluid, preferably air, are sized to provide solder ball flow rates adequate to fill the receptacle 14 quickly. Although there is significant variation from one receptacle to another, typical reservoirs for solder ball handling equipment hold about 250 thousand solder balls. The equipment reservoirs are generally refilled when the solder ball level falls below 50 to 100 thousand solder balls. Equipment reservoir refill times of from one to several seconds are desirable. This means that solder ball flow rates from the apparatus of at least about 20 thousand and more preferably at least about 50 thousand solder balls per second are desired.

Further in accordance with this aspect of the invention, the apparatus includes a trap disposed in the flow path for trapping the solder balls and stopping the flow of the solder balls to the receptacle when the flow actuator is not actuated.

In accordance with the preferred embodiments of this aspect of the invention, the apparatus 10 includes a trap 70 disposed in the flow path 38 for trapping the solder balls 12 and stopping the flow of the solder balls when the ejector pump is not actuated. The trap may be of any form which stops the flow of solder balls when the ejector pump is not actuated, but the preferred form is a vertical elevation in the flow path which traps the solder balls by the force of gravity when the ejector pump is not actuated. The vertical elevation may be in the form of a "U" in the tube which is the flow path similar to the trap in a drain as depicted in FIG. 1. The vertical elevation may be a simple vertical rise in the flow path without a corresponding fall prior to the rise as depicted in FIG. 3. The vertical elevation may occur quickly, for example, at an angle 72 of 90 degrees relative to horizontal, or the angle may be somewhat more gradual such as 45 degrees. The only requirement for the vertical elevation is that the configuration be sufficient to stop the flow of solder balls 12 when the flow actuator 46 is not actuated and that the flow of solder balls proceed when the flow actuator is actuated. Generally, this requires the vertical elevation have a height 74 which is sufficient to stop the flow of solder balls. Since solder balls are a bulk solid material, they do not behave in the same manner as a liquid. In the case of a liquid, the vertical elevation would need to be sufficient to raise the flow path above the level of the liquid in the reservoir to stop the flow of the liquid caused by gravity. Unlike a liquid, solder balls have a frictional force between the balls and to the walls of the flow path when the solder balls are not flowing. This force helps counteract the gravitational forces on the solder balls, thus reducing the necessary elevation height to stop the solder balls from flowing. Generally, a vertical elevation of several inches will stop the flow of solder balls from the reservoir 16 to the receptacle 14 when the flow actuator 46 is not actuated. It is preferable to have the solder balls 12 fill the flow path 38 including the ejector pump when the ejector pump is not actuated and the solder balls are not flowing. This helps the flow start quickly when the ejector pump is actuated. In order to allow solder balls to be contained in the ejector pump when the flow stops, it is preferable that the trap 70 be located between the ejector pump and the second end 42 of the flow path 38. In the preferred embodiments the vertical elevation is in the form of a "U" in the tube which forms the flow path located between the flow actuator and the second end of the flow path, and the height of the vertical elevation is about one to about four inches, and preferably about two inches.

In accordance with another aspect of the invention, an apparatus is provided for supplying solder balls to a receptacle. In the preferred embodiments the apparatus 110 is for supplying solder balls 12 to a receptacle 14 as depicted in FIG. 3. Similar to the preferred embodiment of the apparatus 10 in accordance with the first aspect of the invention, the receptacle 14 may be any item or containing device for receiving solder balls. Examples of common receptacles for solder balls include reservoirs for solder ball handling equipment, storage containers for solder balls such as jars, bags, cans, totes or bins, and any other repository for receiving solder balls. The preferred embodiment of the apparatus 110 in accordance with this aspect of the invention is for use with solder ball handling equipment similar to the preferred embodiment of the first aspect of the invention.

Further in accordance with this aspect of the invention the apparatus includes a reservoir for storing the solder balls 12. In the preferred embodiment of this aspect of the invention, the reservoir 116 is for storing the solder balls. The reservoir has a top 118, side walls 120, and a bottom 122 as shown in FIG. 3. Similar to the preferred embodiment of the first aspect of the invention, in the preferred embodiment of this aspect the reservoir is a hopper and the reservoir 116 has a feed 124 located at the bottom of the reservoir. The bottom tapers in a conical fashion from the side walls to the feed so that the solder balls 12 will flow to the feed as the reservoir 116 is emptied of solder balls. The reservoir 116 includes an opening 126 which is preferably disposed at the top 118 of the reservoir. The opening 126 is sealed by a lid 128 that fits over the opening. The opening is for providing access to the reservoir. The lid 128 also preferably will have a fastener 130 to hold the lid on the reservoir over the opening. The fastener is similar to that described previously for the preferred embodiment in accordance with the first aspect of the invention.

In the preferred embodiment of this aspect of the invention the reservoir includes a non-reactive gas purge 132 for providing a non-reactive gas to the reservoir 116 as shown in FIG. 3, substantially similar to the non-reactive gas purge 32 described for the preferred embodiment of the first aspect of the invention. The non-reactive gas purge 132 includes a non-reactive gas supply 134 and plumbing 136 for routing the non-reactive gas from the non-reactive gas supply 134 to the reservoir 116. The plumbing 136 includes all the necessary piping and fittings to provide a fluid communication path between the non-reactive gas supply and the reservoir. The non-reactive gas purge 132 preferably has a valve and a regulator for controlling and regulating the pressure and the flow of the non-reactive gas to the reservoir 116. The non-reactive gas is chosen to inhibit the corrosion of the solder balls. Preferable gases for use as the non-reactive purge gas are nitrogen, an inert gas such as argon or helium, or dry air. Nitrogen is the preferred non-reactive gas for use with the apparatus 110.

The reservoir 116 preferably is not gas tight. This allows for the non-reactive gas purge 132 to provide a steady flow of clean, dry non-reactive gases to the reservoir. The reservoir capacity is generally at least about one liter, and preferably about two to about four liters.

Further in accordance with this aspect of the invention, the apparatus includes a flow path with a first end connected to and in fluid communication with the reservoir and a second end for supplying the solder balls to the receptacle.

In the preferred embodiment of this aspect of the invention the apparatus 110 includes a flow path 138 with a first end 140 connected to the reservoir 116 at the feed 124 as shown in FIG. 3. The flow path 138 is preferably similar to the flow path 38 described previously for the preferred embodiment of the first aspect of the invention. The first end 140 is in fluid communication with the feed 124 and the reservoir 116 so solder balls 12 can flow from the reservoir into the flow path. The flow path 138 also includes a second end 142 which is located at the other end of the flow path. The second end 142 is in fluid communication with the first end 140 of the flow path so solder balls can flow from the first end to the second end. The second end 142 is the solder ball exit of the apparatus 110 and is for supplying solder balls to the receptacle 14 such as the reservoir of solder ball handling equipment The flow path 138 may be of any configuration and geometry, but the preferred embodiment of the flow path is a tube for transporting the solder balls from the reservoir 116 to the second end 142 of the tube. The preferred embodiment of the tube is similar to that described previously for the preferred embodiment of the first aspect of the invention. The tube has an inside diameter 144, and in the preferred embodiment the tube inside diameter is about 0.1 to about 1.0 inches, and preferably about 0.25 inches.

Further in accordance with this aspect of the invention, the apparatus includes an ejector pump in fluid communication with the flow path, and a fluid supply in fluid communication with the ejector pump for selectively providing a working fluid to actuate the flow of the solder balls from the reservoir through the flow path to the receptacle.

In the preferred embodiment, the apparatus 110 includes an ejector pump 146 in fluid communication with the flow path 138, and a fluid supply 148 in fluid communication with the ejector pump for selectively providing a working fluid to the ejector pump to actuate the flow of solder balls 12 from the reservoir 116 to the receptacle 14 as shown in FIGS. 2 and 3. The ejector pump 146 and the fluid supply 148 in the preferred embodiment of this aspect of the invention are substantially similar to the the preferred flow actuator 146, an ejector pump, and fluid supply 48 previously described for the preferred embodiments of the first aspect of the invention. The preferred location for the ejector pump 146 is in the flow path 138 between the first end 140 and the second end 142 of the flow path. The ejector pump 146 is most preferably located near the first end 140 of the flow path so that the ejector pump 146 is close to the solder balls 12 in the reservoir 116.

The fluid supply 148 is attached to the ejector pump 146 by plumbing 150 which connect to the ejector pump at a working fluid inlet 152. The plumbing 150 provides a fluid communication path between the fluid supply 148 and the ejector pump 146. The fluid supply may be any source of working fluid with a potential energy which may be converted to a mechanical energy to cause the solder balls to flow. The fluid supply is preferably a pressurized gas and most preferably compressed air. If shop air is available at the facility, it is the preferred source of working fluid due to the extremely low cost of shop air. The ejector pump 146 is preferably sized to operate in the pressure range of 15 to 120 psig and more preferably 30 to 60 psig to accommodate the use of shop air.

The fluid supply 148 preferably includes an actuation mechanism 154 which is generally located in the plumbing 150 at or near the ejector pump 146. The actuation mechanism 154 is any form of flow actuator which will provide for the selective supply of the working fluid to the ejector pump. In the preferred embodiment the actuation mechanism 154 is a solenoid valve requiring an electrical or alternately a pneumatic actuation signal to open or close the valve as previously described for the preferred embodiment of the first aspect of the invention.

The ejector pump 146 and pressure of the working fluid, preferably air, are sized to provide solder ball flow rates adequate to fill the receptacle quickly. The ejector pump 146 is preferably sized to provide at least about 20 thousand and more preferably at least about 50 thousand solder balls per second are desired.

Further in accordance with this aspect of the invention, the apparatus includes a vertical elevation disposed in the flow path for trapping the solder balls at the vertical elevation by gravity and stopping the flow of the solder balls to the receptacle when the flow actuator is not actuated.

In the preferred embodiment of this aspect of the invention, the apparatus 110 includes a vertical elevation 170 disposed in the flow path 138 for trapping the solder balls 12 at the vertical elevation by gravity and stopping the flow of the solder balls when the ejector pump 146 is not actuated. The vertical elevation 170 may be a simple vertical rise in the flow path 138 without a corresponding fall prior to the rise as depicted in FIG. 3. Alternately, the vertical elevation 170 may be in the form of a "U" in the tube which is the flow path similar to the trap in a drain as depicted in FIG. 1. The vertical elevation 170 may occur quickly, for example, at an angle 172 of 90 degrees relative to horizontal, or the angle may be somewhat more gradual such as 45 degrees. As described previously for the preferred embodiment of the first aspect of the invention, the only requirement for the vertical elevation 170 is that the configuration be sufficient to stop the flow of solder balls when the ejector pump 146 is not actuated and that the flow of solder balls proceed when the ejector pump is actuated. The vertical elevation 170 has a height 174 which is sufficient to stop the flow of solder balls. Generally, a vertical elevation of several inches will stop the flow of solder balls 12 from the reservoir 116 to the receptacle when the ejector pump 146 is not actuated. In the preferred embodiment of this aspect of the invention, the vertical elevation 170 is in the form of a simple vertical rise in the tube which forms the flow path 138. The vertical rise is located between the ejector pump 146 and the second end 142 of the flow path, and the height of the vertical elevation is about one to about four inches, and preferably about two inches.

In accordance with another aspect of the invention, a method is provided for supplying solder balls to a receptacle. In the preferred embodiments the method is for supplying solder balls 12 to a receptacle 14 which is essentially the same as the receptacle as described for the preferred embodiments of the first and second aspect of the invention.

Further in accordance with this aspect of the invention the method includes a first step of placing the solder balls in a location. In the preferred embodiment of this aspect of the invention, the location is a reservoir similar to reservoir 16 and 116, and the reservoir is for storing the solder balls 12. For example, in the preferred embodiment of this aspect the reservoir is a hopper and the reservoir has a feed 24 or 124 located at the bottom of the reservoir. The reservoir preferably includes an opening 26 or 126 disposed at the top of the reservoir and sealed by a lid 28 or 128 that fits over the opening. The opening is for providing access to the reservoir. The lid also preferably will have a fastener 30 or 130 to hold the lid on the reservoir over the opening. The fastener is similar to that described previously for the other preferred embodiments of the invention.

In the preferred embodiment of this aspect of the invention the reservoir includes a non-reactive gas purge 32 or 132 for providing a non-reactive gas to the reservoir as described previously. The non-reactive gas purge preferably includes a non-reactive gas supply 34 or 134 and plumbing 36 or 136 for routing the non-reactive gas from the non-reactive gas supply to the reservoir. The plumbing includes all the necessary piping and fittings to provide a fluid communication path between the non-reactive gas supply and the reservoir. The non-reactive gas purge preferably has a valve and a regulator for controlling and regulating the pressure and the flow of the non-reactive gas to the reservoir. Preferable gases for use as the non-reactive purge gas are nitrogen, an inert gas such as argon or helium, or dry air. Nitrogen is the preferred non-reactive gas for use with the apparatus.

The reservoir preferably is not gas tight. This allows for the non-reactive gas purge to provide a steady flow of clean, dry non-reactive gases to the reservoir. The reservoir capacity is generally at least about one liter, and preferably about two to about four liters.

Further in accordance with this aspect of the invention, the first step of the method includes providing the location with a flow path in fluid communication with the location.

In the preferred embodiment of this aspect of the invention the apparatus includes a flow path similar to flow path 38 or 138 previously described. The flow path has a first end 40 or 140 connected to the reservoir at the feed, and a second end 42 or 142 which is located at the other end of the flow path. The second end is in fluid communication with the first end of the flow path so solder balls can flow from the first end to the second end. The second end is the solder ball exit of the apparatus and is for supplying solder balls to the receptacle such as the reservoir of solder ball handling equipment The flow path may be of any configuration and geometry, but the preferred embodiment of the flow path is a tube for transporting the solder balls from the reservoir to the second end of the tube as described previously for flow paths 38 and 138. The tube has an inside diameter 44 or 144, and in the preferred embodiment the tube inside diameter is about 0.1 to about 1.0 inches, and preferably about 0.25 inches.

Further in accordance with this aspect of the invention, the first step of the method includes providing the flow path to require an actuation energy for the solder balls to flow from the location to the receptacle. The actuation energy is greater than a force on the solder balls provided by gravity when the solder balls are in the location so the solder balls do not flow from the location to the receptacle absent the actuation energy.

In the preferred embodiment of this aspect of the invention, the first step of the method includes providing the flow path to include a vertical elevation similar to vertical elevation 70 or 170 previously described. The vertical elevation requires an actuation energy for the solder balls to flow from the location to the receptacle. The actuation energy is greater than a force on the solder balls provided by gravity when the solder balls are in the location so the solder balls do not flow from the location to the receptacle absent the actuation energy. As described previously, the only requirement for the vertical elevation is that the configuration be sufficient to require an to stop the flow of solder balls when the actuation energy is not provided to the solder balls. The vertical elevation has a height 74 or 174 which is sufficient to stop the flow of solder balls. As described previously for vertical elevations 70 and 170, a vertical elevation of several inches will stop the flow of solder balls from the reservoir to the receptacle when the flow actuator is not actuated. In the preferred embodiment of this aspect of the invention, the vertical elevation is in the form of a simple vertical rise in the tube which forms the flow path located between the flow actuator and the second end of the flow path, and the height of the vertical elevation is about one to about four inches, and preferably about two inches.

Further in accordance with this aspect of the invention, the method includes a second step of selectively providing the actuation energy to the solder balls to cause the solder balls to flow of from the location to the receptacle.

In the preferred embodiment, the method includes a second step of selectively providing the actuation energy to the solder balls by using a flow actuator similar to the flow actuator 46 or ejector pump 146, the actuation energy causing the solder balls to flow from the location to the receptacle. The flow actuator 46 or ejector pump 146 is in fluid communication with the flow path so that it can provide the actuation energy to the solder balls to cause them to flow. The method preferably includes providing a fluid supply 48 or 148 in fluid communication with the flow actuator for selectively providing a working fluid to the flow actuator to actuate the flow of solder balls from the reservoir to the receptacle as previously described. The preferred location for the flow actuator is in the flow path located near the first end of the flow path so that the flow actuator is close to the solder balls in the location. The preferred flow actuator is an ejector pump as previously described.

The preferred ejector pump for use with the method is similar to that previously described for ejector pump 46 or 146 shown in FIG. 2. For example, the ejector pump includes a manifold 56 which distributes the pressurized gas to a set of primary nozzles 58 distributed around the inside wall 60 of the ejector pump. The inside flow passage 62 of the ejector pump is essentially cylindrical in shaped and forms a flow passage through the ejector pump with an inlet end 64 and an exhaust end 66. The ejector pump primary nozzles are for discharging the pressurized gas provided by the working fluid supply at a high velocity, preferably sonic or supersonic. The primary nozzles are oriented to discharge the pressurized gas into the flow passage in the general direction of the flow direction 68. The nozzles may also be oriented somewhat off the flow direction to enhance the mixing and flow of the material being pumped. When the pump is actuated the solder balls mix with the gases discharging through the primary nozzles and a significant portion of the momentum of these gases are imparted to them; thus, providing the actuation energy to the solder balls causing them to flow.

The fluid supply is preferably attached to the ejector pump by plumbing 50 or 150 which connect to the ejector pump at a working fluid inlet 52 or 152. The plumbing provides a fluid communication path between the fluid supply and the ejector pump. The fluid supply may be any source of working fluid with a potential energy which may be converted to the actuation energy to cause the solder balls to flow. The fluid supply is preferably a pressurized gas and most preferably compressed air. If shop air is available at the facility, it is the preferred source of working fluid due to the extremely low cost of shop air. The ejector pump is preferably sized to operate in the pressure range of 15 to 120 psig and more preferably 30 to 60 psig to accommodate the use of shop air.

The fluid supply preferably includes an actuation mechanism 54 or 154 which is generally located in the plumbing at or near the flow actuator as previously described. The actuation mechanism is any form of flow actuator which will provide for the selective supply of the working fluid to the flow actuator. In the preferred embodiment the actuation mechanism is a solenoid valve requiring an electrical or alternately a pneumatic actuation signal to open or close the valve.

The ejector pump and pressure of the working fluid, preferably air, are sized to provide solder ball flow rates adequate to fill the receptacle quickly. The ejector pump is preferably sized to provide at least about 20 thousand and more preferably at least about 50 thousand solder balls per second are desired.

When used in the preferred embodiment of this aspect of the invention, the method is for use with a receptacle such as an equipment reservoir that preferably has a level sensor which senses the level of solder balls in the equipment reservoir. The level sensor provides a signal to a control system to inform the system that the level of solder balls in the equipment reservoir has fallen below a predetermined low level. The control system includes the necessary logic to recognize this signal and provide an electrical actuation signal to the solenoid valve so the valve is opened and compressed air is supplied the ejector pump and the equipment reservoir is refilled with solder balls, as described previously. The level detector in the equipment reservoir preferably detects when the equipment reservoir is full of solder balls and provides another signal to the control system informing the system that the equipment reservoir is full. Again, the control system includes the required logic to recognize this signal and discontinue the electrical actuation signal to the valve so that the solder balls discontinue flowing to the equipment reservoir.

Further in accordance with this aspect of the invention, the method includes a third step of removing the actuation energy to cause the solder balls to stop flowing from the location to the receptacle. In the preferred embodiment in accordance with this aspect of the invention, the electrical signal is removed from the valve and the ejector pump discontinues providing the actuation energy to the solder balls, thus causing the solder balls to stop flowing, as previously described.

Additional advantages and modifications will readily occur to those skilled in the art. Therefore, the invention in its broader aspects is not limited to the specific details, representative devices and methods, and illustrative examples shown and described. Accordingly, departures may be made from such details without departing from the spirit or scope of the general inventive concept as defined by the appended claims and their equivalents.

What is claimed is:

1. An apparatus for supplying solder balls to a receptacle, the apparatus comprising:

a reservoir for storing the solder balls;

a flow path including a first end connected to and in fluid communication with the reservoir and a second end for supplying the solder balls to the receptacle;

an ejector pump in fluid communication with the flow path;

a fluid supply in fluid communication with the ejector pump for selectively providing a working fluid to the ejector pump to actuate the flow of the solder balls from the reservoir through the flow path to the receptacle; and a vertical elevation disposed in the flow path for trapping the solder balls at the vertical elevation by gravity and stopping the flow of the solder balls to the receptacle when the ejector pump is not actuated.

2. An apparatus as recited in claim 1, wherein the reservoir comprises a hopper with a feed in fluid communication with the first end of the flow path, the feed being located at the bottom of the hopper.

3. An apparatus as recited in claim 1, wherein the reservoir has a reservoir capacity equal to the maximum volume of solder balls which can be stored in the reservoir, and the reservoir capacity is at least about one liter.

4. An apparatus as recited in claim 1, wherein the ejector pump is located in the flow path between the first end and the second end.

5. An apparatus as recited in claim 1, wherein the flow path comprises a tube.

6. An apparatus as recited in claim 1, wherein the working fluid comprises a gas at a pressure of about 15 psig to about 120 psig.

7. An apparatus as recited in claim 1, wherein the ejector pump actuates flow of the solder balls in the flow path at a flow rate, the flow rate being at least about 20,000 solder balls per second.

8. An apparatus as recited in claim 1, wherein the vertical elevation is located between the flow actuator and the second end of the flow path.

9. An apparatus as recited in claim 1, wherein the vertical elevation has a height of about one inch to about four inches.

10. An apparatus as recited in claim 1, wherein the reservoir includes a non-reactive gas purge for providing a non-reactive gas to the reservoir.

11. An apparatus as recited in claim 10, wherein the non-reactive gas comprises at least one of nitrogen, an inert gas, and dry air.

* * * * *